US005509017A

United States Patent [19]

Brandenburg et al.

[11] Patent Number: 5,509,017

[45] Date of Patent: Apr. 16, 1996

[54] PROCESS FOR SIMULTANEOUS TRANSMISSION OF SIGNALS FROM N SIGNAL SOURCES

[75] Inventors: Karl-Heinz Brandenburg, Erlangen; Heinz Gerhäuser, Waischenfeld; Dieter Seitzer, Erlangen; Thomas Sporer, Fürth, all of Germany

[73] Assignee: Fraunhofer Gesellschaft zur Forderung der angewandten Forschung e.V., Munich, Germany

[21] Appl. No.: 232,094

[22] PCT Filed: Oct. 28, 1992

[86] PCT No.: PCT/DE92/00905

§ 371 Date: Apr. 29, 1994

§ 102(e) Date: Apr. 29, 1994

[87] PCT Pub. No.: WO93/09645

PCT Pub. Date: May 13, 1993

[30] Foreign Application Priority Data

Oct. 31, 1991 [DE] Germany .......................... 41 35 977.1

[51] Int. Cl.[6] ....................................................... H04N 7/12

[52] U.S. Cl. .......................... 370/112; 370/118; 348/388; 348/403

[58] Field of Search .................................. 370/112, 110.1, 370/95.1, 118, 77, 79, 80, 81; 348/398, 420, 438, 403, 388, 390, 395, 405, 419, 423, 384

[56] References Cited

U.S. PATENT DOCUMENTS

| | | | |
|---|---|---|---|
| 5,115,309 | 5/1992 | Hang | 370/79 |
| 5,216,503 | 6/1993 | Paik et al. | 348/398 |
| 5,309,232 | 5/1994 | Hartung et al. | 348/398 |

FOREIGN PATENT DOCUMENTS

| | | | |
|---|---|---|---|
| 0327101 | 2/1989 | European Pat. Off. | H04J 3/16 |
| 0479432 | 4/1992 | European Pat. Off. | H04N 7/13 |

OTHER PUBLICATIONS

Kou et al, "Digital Speech Interpolation for Variable Rate Coders with Application to Subband Coding", Oct. 1985, pp. 1100–1108.

Waal et al., "Subband Coding of Stereophonic Digital Audio Signals", 1991, pp. 3601–3604.

Hang et al, "Digital HDTV Compression Using Parallel Motion–Compensated Transform Coders", Jun. 1991, pp. 210–221.

Taka, "Low–Bit–Rate Speech Codecs and Wideband Speech Codecs", Jan. 1988, pp. 49–55.

*Primary Examiner*—Melvin Marcelo
*Assistant Examiner*—Huy D. Vu
*Attorney, Agent, or Firm*—Antonelli, Terry, Stout & Kraus

[57] ABSTRACT

A process for simultaneous transmission of signals from N signal sources via a corresponding number of transmission channels, in which the individual signals are divided into blocks and the blocks are transformed into spectral coefficients by transformation or filtering, the spectral coefficients undergoing a data reduction process. The blocks belonging to the individual signals are divided into sections. The respective current sections of all signals are processed simultaneously. The permissible interference for each section is determined utilizing a perception-specific model, and a request of currently required overall transmission capacity is calculated. The allotment of maximum transmission capacity at disposal for each individual signal is calculated from the overall transmission capacity at disposal and the currently required overall transmission capacity. Each signal is coded and transmitted with the thus determined capacity.

13 Claims, 2 Drawing Sheets

PROCESS FOR SIMULTANEOUS TRANSMISSION OF SIGNALS FROM N SIGNAL SOURCES

TECHNICAL FIELD

The present invention relates to a process fo simultaneous transmission of signals from N signal sources via a corresponding number of transmission channels.

STATE OF THE ART

Processes in which the individual signals are divided into blocks and these blocks are transformed by transformation or filtering into spectral coefficients which for their part undergo a data reduction process or which are coded according to a data reduction process respectively, are known. In this connection, reference is made to, by way of illustration, the overview article "Perceptual Audio coding" by Jörg Houpert in Studio-Technik or the article "Daten-Diät, Datenreduktion bei digitalisierten Audio-Signalen" by Stefanie Renner in Elrad, 1991. These overview articles as well as the PCT A-document WO 88/01811 are explicitly referred to with regard to the explanation of any terms and process steps not made more apparent herein.

In a number of cases, it is necessary to transmit signals from several signal sources simultaneously via a corresponding number of transmission channels. The transmission of stereo signals via two transmission channels is mentioned as the most simple example therefor.

The transmission of signals from N signal sources via a corresponding number of transmission channels presents the problem of dimensioning the transmission channels:

If each individual transmission channel is dimensioned in such a manner that it transmits the "maximum incident bit flow", comparatively large transmission capacity remains unused "on the average".

In the transmission of signals from numerous signal sources via a corresponding number of transmission channels, it is known from digital telephone technology to design the transmission channels for only "average demand" and to balance short-term increased demand on individual channels by allotment from other channels. The allotment ensues exclusively via signal statistics.

For the state of the art, reference is made to the following literary sources "Ein digitales Sprachinterpolationsverfahren mitprädiktlonsgesteuerter Wortaufteilung" by Dr. H. Gerhäuser (1980), "Ein digitales Sprachinterpolationsverfahren mit momentaner Prioritätszuteilung", by R. Woltowitc (1977) and "Ein digitales Sprachinterpolationsverfahren mit blockweiser Prioritätszutellung" by G. G. Klahnenbucher (1978).

An element of the present invention is that it was understood that the usual processes in digital telephone technology for balancing fluctuating demand in the transmission of numerous signals via a corresponding number of transmission channels does not have good results if the digital signals to be transmitted previously underwent data reduction, by way of illustration, according to the so-called OCF process.

SUMMARY OF THE INVENTION

The object of the present invention is to provide a process for simultaneous transmission of signals from N signal sources via a corresponding number of transmission channels with which "data-reduced signals" can be transmitted via transmission channels that are only dimensioned for "average demand" without any perceptible, i.e. by way of illustration audible, loss in signal capacity.

The present invention is based on the fundamental idea not to conduct the allotment to the individual signals according to statistical considerations in balancing the fluctuating requirements during simultaneous transmission of signals from N signal sources via a corresponding number of transmission channels, but rather already to balance the fluctuating demand by appropriate means in the process step in which the signals are coded for data reduction.

BRIEF DESCRIPTION OF THE DRAWINGS

This inventive fundamental idea is explained in the following, using a preferred embodiment with reference to the accompanying drawings, in which.

Figure 1:
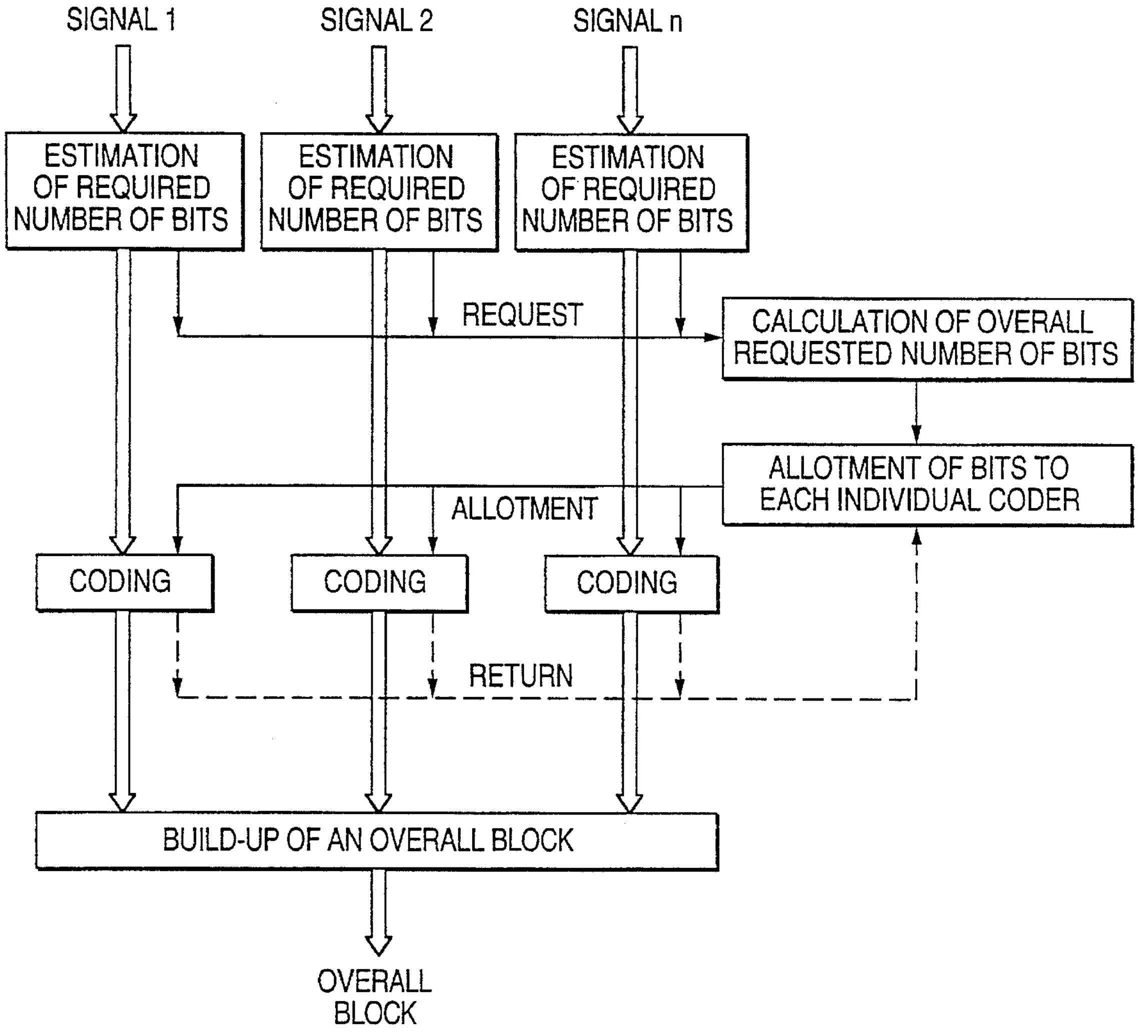
FIG. 1 is a block diagram to explain the invented process.

In the invented process the individual signals are divided into blocks, and the blocks are transformed into spectral coefficients by transformation or filtering. To balance the fluctuating demand, the blocks belonging to the individual signals are divided into sections, and the respective current sections of all signals are processed simultaneously. This is graphically illustrated in FIG. 1 by the corresponding "function blocks".

Employing a perception-specific model which, by way of illustration, when transmitting audio-signals can be a psycho-acoustic model, the permissable interference is determined for each section, and from it is calculated the request for the currently required overall transmission capacity. This calculation of the overall transmission capacity, i.e. the required number of bits, occurs in all the blocks simultaneously. From all the transmission capacity at disposal and the currently required overall transmission capacity, the allotment of maximum transmission capacity at disposal is calculated for each individual signal. With each "number of bits" alloted to each signal, the coding of the individual signal occurs and accordingly the transmission of this individual signal. In the simplest case, balancing or equalizing can only occur in the re-spective required transmission capacity between the channels.

In a further improvement, there is a transmission capacity reserve, a so-called bit reservoir, from which, in the event that the required overall transmission exceeds the transmission capacity on the average at disposal, an allotment of transmission capacity occurs.

This bit reservoir is filled whenever the requested transmission capacity is less than the transmission capacity at disposal.

In any case, it is necessary, in order to prevent an increase in the bit reservoir being to great, if the transmission capacity is much smaller than the transmission capacity at disposal, that there is a forced allotment of bits to the individual channels. This forced allotment occurs preferably only to the channels allocated, respectively to the signal sources, that have reported a need that is greater than average demand. A substantially greater demand than the average demand, noteably, means that these signals are substantially more difficult to code than usual signals.

Figure 2A:
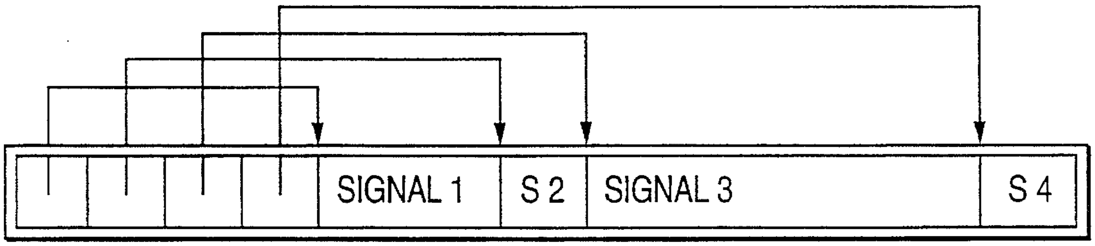
FIGS. 2*a* and 2*b* depict the invented signal build-up

In any event, it is preferable if an overall block is formed from all the separately coded signals from the signal sources. This overall block is composed of a fixed region containing information from which the separation of signals can be determined and of several regions of more flexible length which receives the coded signals. This is diagrammatically shown in FIG. 2*a*.

Figure 2B:
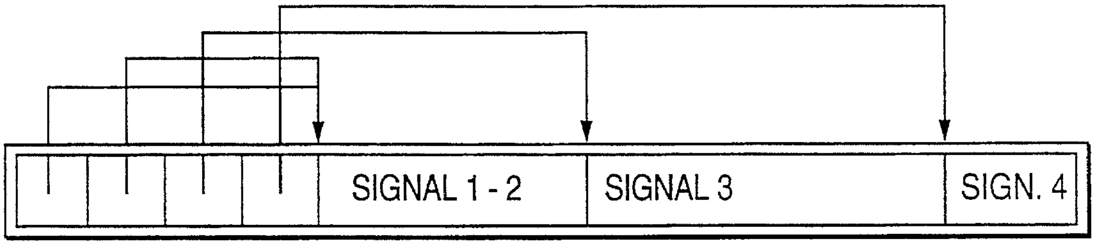

Further saving in transmission capacity is achieved in that identical input signals are recognized and are transmitted only once by a suitable transmission format. This is diagramatically shown in FIG. 2*b*.

In any case, the currently required transmission capacity can be accurately determined or only estimated.

Moreover, to a great extent the invented process can be conducted parallel. To do this, it is preferable if coding of the individual signals occurs during calculation of the allotment of the transmission capacity for each signal.

If the required transmission capacity exceeds the transmission capacity at disposal and no allotment from the bit reservoir can occur, the value of the permissible interference for all the signals can be raised in such a manner that the required overall transmission capacity does not exceed the transmission capacity at disposal.

In the following a numerical example of a manner of proceeding for audio signals is given. It is explicitly pointed out that the invented fundamental idea is not restricted to audio signals, but also video signals or other signals underlying a perception-specific assessment can be treated similarly.

Example of a possible manner of proceeding for audio signals:

Assuming that y(t) represents the sampling values of the audio signal.

1) The audio signal y is broken down or separated in a known manner into the sampling values (y(t)), which are digitized. The digitized sampling values are broken down or decomposed into blocks of the length 2n, which in the selected embodiment are overlapping blocks having an overlapping of n:

$$x(k,b)=y(b*n+k) \text{ for } k=o \ldots 2n \text{ (}b\text{ block number).}$$

2) Each block of length n is transformed into spectral coefficients by transformation, by way of illustration Fast Fourier Transformation or a cosine transformation:

$$x(j,b) = \mathrm{SUM}(1 = 0 \ldots 2n;$$
$$x(1,b)*f(1)*\cos(pi*(21 + 1 + n)(2j + 1)/(4n))) \text{ for}$$
$$j = 0 \ldots n \text{ with } f(1) = sqrt(2)*\sin(pi * (1 + 0.5)/(2n))$$

3) Each of the blocks is divided into sections and the energy density is calculated for each section:

$$E(i,b=(\mathrm{SUM}(k=a(i)+1 \ldots a(i+1); X(k,n)^2))/(a(i+1)-a(i)) \text{ for } i=1 \ldots c,$$

with the coefficients a(i) being taken from the following Table 1.

4) The permissible interference is calculated for each section with a suited psycho-acoustical model, for which the literature is to be referred. The masking between the bands is yielded from the permitted interference $$T(i,b)=\mathrm{MAX}(k=1 \ldots i-1; E(k,b)*z(i-k))$$

the masking in the band:

$$s(i,b)=\max(E(i,b)*e(i), T(i,b))$$

and the masking between the blocks:

$$ss(i,b)=\max(s(i,b-1)/16, s(i,b))$$

thereon follows the calculation of the required number of bits for each block.

5) Calculation of the required number of bits for the block:

a) for a coding like in the case of OCF (Huffman coding):

$$p=p0+\mathrm{SUM}(i=1 \ldots C; (a(i+1)-a(i)*(s(i,b)/ss(i,b)))$$

b) for PCM coding (SNR=6 dB/bit):

A scaling factor and the number of bits per sampling value as additional information are transmitted for each section $$p=p0+\mathrm{SUM}(i=1 \ldots c; (a(i+1))*10/6* \log(E(i,b)/ss(i,b)))$$

The pertinent values for the individual values, respectively for the individual constants, are Given in the form of tables in the following:

n=512 c=23 pO=1200 for OCF (average number of bits per block)

pO=345 for PCM (scaling factors: 10 bit/section, coding of the number of quantization steps: 5 bits/section

TABLE 1

| i | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| a(i) | 0 | 4 | 8 | 12 | 16 | 20 | 24 | 28 | 32 | 36 | 40 | 46 | 52 | 60 |
| i | 15 | 16 | 17 | 18 | 19 | 20 | 21 | 22 | 23 | 24 | | | | |
| a(i) | 70 | 82 | 96 | 114 | 136 | 164 | 198 | 240 | 296 | 372 | | | | |

TABLE 2

| i | 1 | 2 | 3 | 4 | 5 |
|---|---|---|---|---|---|
| e(i) | 1e − 1 | 1e − 2 | 1e − 3 | 1e − 4 | 1e − 5 |
| i | 6 | 7 | 8 | 9 | |
| e(i) | 1e − 6 | 1e − 7 | 1e − 8 | 1e − 9 | a(1) |

0 for i > 9

TABLE 3

| i | 1 | 2 | 3 | 4 | 5 | 6 | 7 |
|---|---|---|---|---|---|---|---|
| e(i) | 0.0004 | 0.0004 | 0.0004 | 0.0004 | 0.0004 | 0.0004 | 0.0004 |

| i | 8 | 9 | 10 | 11 | 12 | 13 | 14 | 15 |
|---|---|---|---|---|---|---|---|---|
| e(i) | 0.002 | 0.002 | 0.002 | 0.004 | 0.01 | 0.015 | 0.025 | 0.04 |
| i | 16 | 17 | 18 | 19 | 20 | 21 | 22 | 23 |
| e(i) | 0.06 | 0.06 | 0.06 | 0.08 | 0.08 | 0.11 | 0.14 | 0.18 |

This is followed by the allotment of the number of bits to the individual signals. For this it is assumed that k(k)-bits are requested for coding the K input signals while psoll number of bits are at disposal.

$$psum=\mathrm{Sum}((p)\ k))$$

Now it is necessary to differenciate:

1) If psum=psoll

Each signal receives the requested number of bits:

$$z(k)=P(k)$$

2) If psum<psoll

Each signal receives more than the requested number of bits:

$$z(k)=(\text{psoll}/\text{psum})*p(k)$$

e.g., K=2, psoll=1600, p(1)=540,p(2)=660 psum=1200

$$z(1)=1600/1200*540=720 \text{ (180 bits more)}$$

$$z(2)=1600/1200*660=880 \text{ (220 bits more)}$$

3) If psoll>psum

Each signal receives less than the requested number of bits:

a) for OCF: z(k)=(psoll/psum) * p(k)

b) for PCM:

The minimum number of bits for each signal must not be undercut:

$$z(k)=pO+((\text{psoll}-K*pO))*(p(k)-pO)$$

e.g., K=2, psoll=1600, p0=500, p(1)=600, p(2)=1200 then Psum=1800

$$z(1)=500+(1600-2*500)/(1800-2*500)*(600-500)=575$$

(25 bits less)

$$z(2)=500+(1600-2*500)/(1800-2*500)*(1200-500)=1025$$

(175 bits less)

In order to correct the permissible interference, the following differentiation is necessary if p bits are requested for each signal but z bits are alloted:

1) If the alloted number of bits equals the requested number: no correction is required.

2) If more bits were alloted than were requested:

For OCF: no correction is required.

For PCM: The number of bits at disposal for quantization in each section is increased by (z-p)/512.

3) If the number of bits being alloted is less than being requested:

For OCF:

$$ss(i,b)=s(i*b) \quad + \quad (z-pO)/(p-oO \quad * \quad (ss(i,b)-s(i,b)) \quad \text{for } p>pO$$

$$ss(i,b)=s(i,b) \quad \text{for } p<=pO$$

For PCM: The number of bits at disposal for quantization in each section are increased by (z-p)/512.

In the case of PCM, a rounding off bit per ATW to an integer is required. In order to do this all bits/ATW are rounded off to the next lowest integer, and the resulting bit sum is determined therefrom.

If there are still bits at disposal, one bit/ATW more is placed at disposal in a first estimation run for each band beginning with the lowest band until the number of bits at disposal is reached.

Example

| | 104 bits are at disposal | | | |
|---|---|---|---|---|
| Section: | 1 | 2 | 3 | 4 |
| Width: | 4 | 6 | 8 | 12 |
| Bits/ATW: | 4.2 | 5.2 | 3.4 | 2.4 |

-continued

| | 104 bits are at disposal | | | |
|---|---|---|---|---|
| Section: | 1 | 2 | 3 | 4 |
| rounded off: | 4 | 5 | 3 | 2 |
| *Width | 16 | 30 | 24 | 24 |
| | still to be alloted: 10 bits | | | |
| | +1 | +1 | | |
| Result: | 5 | 6 | 3 | 2 |

The present invention has been described hereinbefore using preferred embodiments. There are, of course, very many different variations possible within the scope of the overall inventive idea:

A fixed overall block length can be employed, with filling bits being used or there is a transfer of not yet ended coders. Furthermore, a flexible block length can be employed which prescribes a maximum block length and in addition time averaging occurs.

What is claimed is:

1. A process for simultaneous transmission of signals from N signal sources via a corresponding number of transmission channels, in which the individual signals are divided into blocks and the blocks are transformed into spectral coefficients, the spectral coefficients undergoing a data reduction process, characterized by:

the blocks belonging to respective individual signals are divided into sections, the respective current sections of all signals are processed simultaneously, the permissible interference for each section is determined utilizing a perception-specific model and a request of currently required overall transmission capacity is calculated, the allotment of maximum transmission capacity at disposal for each individual signal is calculated from the overall transmission capacity at disposal and the currently required overall transmission capacity, and each of the individual signals is coded and transmitted with the thus determined capacity.

2. A process according to claim 1, characterized by there being a reserve of transmission capacity from which an allotment occurs if the required overall transmission capacity exceeds the average transmission capacity at disposal.

3. A process according to claim 2, characterized by the bit reservoir being filled if the requested transmission capacity is smaller than the transmission capacity at disposal.

4. A process according to claim 3, characterized by a forced allotment occurring in order to prevent the bit reservoir from increasing too greatly if the requested transmission capacity is very much smaller than the transmission capacity at disposal.

5. A process according to claim 4, characterized by the forced allotment only occurring if there is a need greater than the average need.

6. A process according to one of claims 1 to 5, characterized by identical input signals being recognized and being transmitted only once by a suited transmission format.

7. A process according to claim 1, characterized by the determination of the currently required transmission capacity occuring accurately.

8. A process according to claim 1, characterized by the determination of the currently required transmission capacity being estimated.

9. A process according to claim 1, characterized by an overall block being formed from all the separately coded signals from the signal sources, the overall block being composed of a fixed section containing information from which the separation of the individual signals can be determined and composed of several regions of flexible length.

10. A process according to claim 1, characterized by the coding of the individual signals already occurring during the calculation of the allotment of the transmission capacity for each signal.

11. A process according to claim 1, characterized by, if the requested number of bits exceeds the overall number of bits at disposal, the permissable interference for all the signal sources being increased so that a reduced bit request is yielded.

12. A process according to claim 1, wherein the blocks are transformed into spectral coefficients by transformation.

13. A process according to claim 1, wherein the blocks are transformed into spectral coefficients by filtering.

* * * * *